United States Patent Office 3,326,654
Patented June 20, 1967

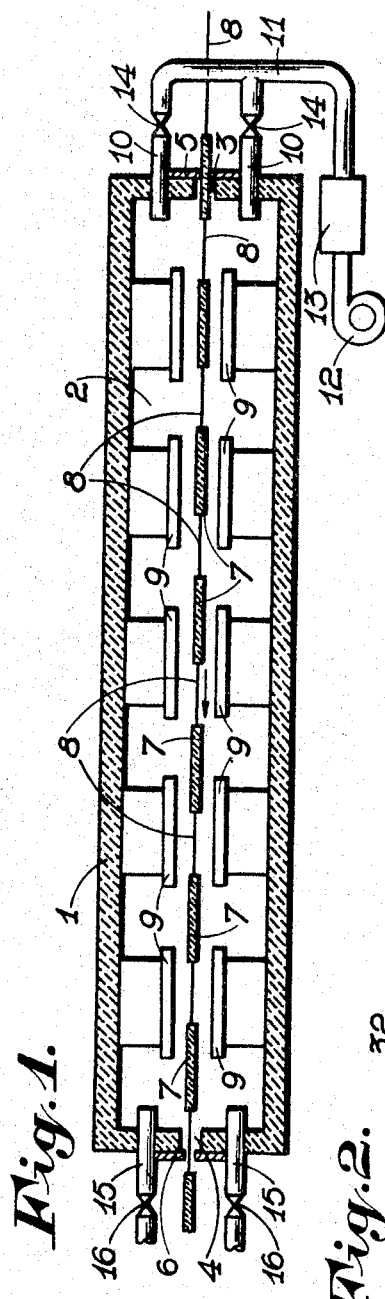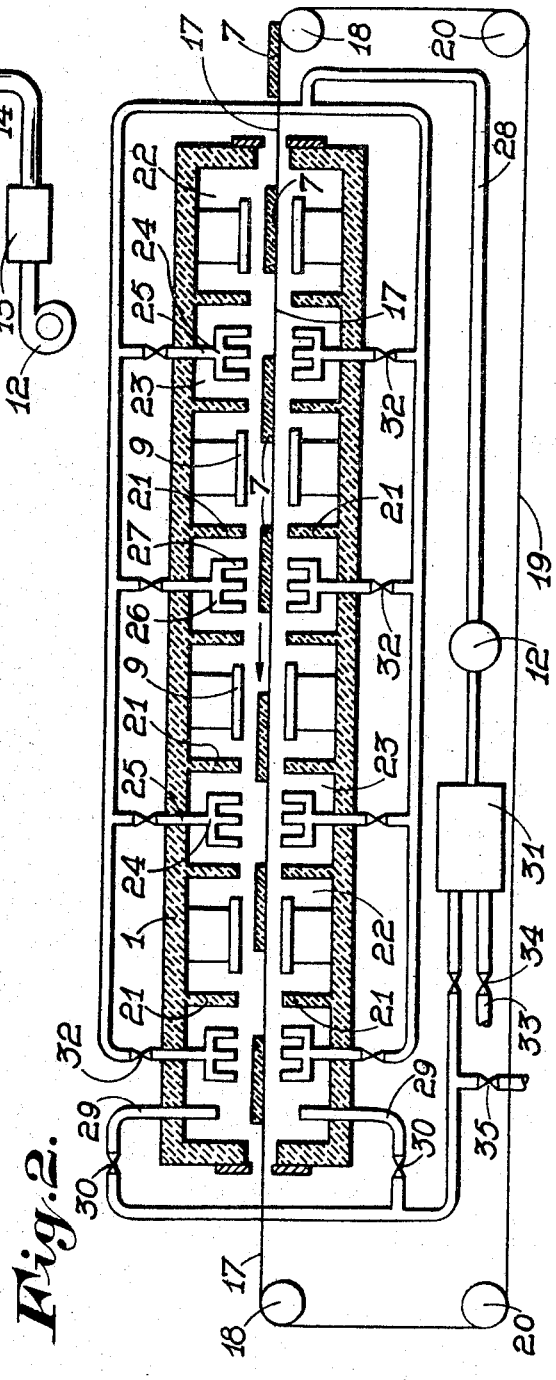

3,326,654
PROCESS AND ARRANGEMENT FOR HEATING GLASS SHEETS WITH A VIEW TO SUBSEQUENT THERMAL TREATMENT
Emile Plumat, Gilly, Belgium, assignor to Glaverbel, Brussels, Belgium, a Belgian company
Filed Sept. 10, 1963, Ser. No. 307,840
Claims priority, application Belgium, Nov. 19, 1962, 499,729, Patent 625,027
8 Claims. (Cl. 65—111)

The present invention relates to a process and to an arrangement for heating glass, which is particularly suitable for the preliminary heating with a view to subsequent thermal treatment of the glass, such as the hardening thereof.

The processes employed at the present time for heating glass generally consist in that the glass is heated either by being brought into contact with hot gases or by subjecting it to the radiation of radiant elements. These heating methods are disadvantageous, since it is only the surfaces of the glass element which are directly heated, whereas the interior or core of the element is heated by heat conduction in the glass, and thus fairly slowly because of the low thermal conductivity of the glass. Even the radiated heat does not penetrate into the glass, because the glass is opaque in an important region of the infra-red spectrum. Limits are thus set as regards the speed of heating the glass elements, because it is only possible to use a certain value as regards temperature gradient in the element without danger of the element breaking, at least below the softening temperature.

These heating methods are particularly disadvantageous in the case of thermal treatments, for example the hardening treatment. In this latter case, the glass is in effect heated until the temperature of at least the interior or the core of the element is higher than the softening temperature of the glass in question. In the known heating processes, the surfaces are brought to a temperature at least equal to that of the core, so that the glass element is completely softened.

The result of this is frequently deformations, surface impressions or similar defects, especially near the points at which the sheets of hardened glass are engaged.

The process according to the invention obviates these disadvantages and has several advantages.

One of the advantages of the process is to permit high heating speeds for the glass elements, even when these latter are thick. Another advantage is to achieve a selected temperature gradient in the glass elements and particularly to bring the core of the elements to a temperature at least equal to that of the surfaces. These advantages and others will be more clearly apparent from the following description.

In accordance with the process of the invention, the glass elements are subjected simultaneously to a thermal energy exchange by convection between the surfaces of the elements in a gaseous medium, and to a thermal energy radiation which is produced by elements heated to high temperature and comprises an appreciable part of the rays passing through the glass so as to bring the core of the glass elements to a temperature at least equal to that of the layers near the surfaces.

Colourless glass is generally transparent for rays of fairly short wavelengths which include the visible spectrum and the fairly adjacent infra-red portion. It is opaque to longer wavelengths and thus in the more remote infra-red region.

The coefficient of absorption of the light rays by the glass depends on the composition of the latter, so that it is not possible to assign precise limits to the zone for which the glass is transparent. By way of example, a soda-lime glass used for drawing window glass absorbs little of the infra-red rediation having waves with a length lower than 2.7 microns.

As set out above, the radiant elements producing the radiated energy are heated to a high temperature, i.e. to a temperature sufficiently high for the radiation to comprise an appreciable part of the rays capable of penetrating into the glass and in part of passing through the glass, and thus having rays with a wavelength lower than for example 2.7 microns. The composition of the emitted radiation spectrum is a direct function of the absolute temperature of the radiant elements, but since the behaviour of the glass with respect to the radiation depends on the composition of the glass, the optimum temperature of the radiant elements cannot be specified in general form. By way of example, it can be indicated that as regards a soda-lime glass with a composition suitable for drawing, the radiant elements should be heated to a temperature in the region of at least 1200° C.

The part of the thermal energy which penetrates into the glass and is absorbed therein heats the latter throughout its thickness. The rapid penetration of this energy as far as the core of the glass has the consequence that the glass is prepared for the subsequent thermal treatment in a shorter period of time than is the case when the thermal energy is accumulated at the glass surface and penetrates into the interior of the latter by necessarily slow conduction, due to the fact that glass is a bad heat conductor. Since the duration of the subsequent thermal treatment of the glass is frequently shorter than that required for heating the glass in order to prepare it for this treatment, especially when this latter treatment consists of a hardening treatment, the reduction of the glass heating period by the use of radiated thermal energy as described above is advantageous for both operations. This advantage has repercussions on the other operations in the manufacturing cycle by making it possible for these operations to be maintained at their highest possible rate.

Simultaneously with the radiated thermal energy, the glass is exposed according to the invention to the thermal energy acting on the surfaces by convection in a gaseous medium. This latter receives the thermal energy acting by convection, at least in part, in a gas heating arrangement which is preferably disposed outside the chamber in which the heating of the glass elements is carried out, while a part of this energy can be supplied within the chamber by the radiated thermal energy which does not participate in the heating of the core of the glass. All the thermal energy having the gaseous medium as support and acting by convection is controlled so that the surface layers of the glass are finally brought to a temperature which reaches at most the temperature of the glass core, but preferably a temperature which is lower than that of the said core. Thus, it is possible to create between the surface layers of the glass and the core of the latter the required temperature gradient which is favourable for the subsequent thermal treatment of the glass, for example, it is possible to bring the core of the glass to a temperature higher than the softening temperature of the glass and the surface layers to a temperature below the said softening temperature. It is possible in this way to avoid deformation of the glass elements during the heating or the marking of the glass with impressions which would cause considerable quantities of rejects. In addition, when the hardening of the glass constitutes the subsequent glass treatment, this operation is made easier by the fact that the temperature gradient no longer has to be reversed at the commencement of the operation, as is the case in the processes used at present.

It would obviously be difficult to specify the quantity of thermal energy communicated to the gaseous medium or the temperature which this latter has to reach in relation to the required temperature of the surface layers of the glass, as there are too many factors which have to be considered. It has been established that the quantity of thermal energy exchanged with the glass by convection in the gaseous medium is relatively modest in relation to the quantity of radiated thermal energy.

The arrangement for heating the glass elements with a view to a subsequent thermal treatment thereof, comprises a closed chamber provided with a conveyor for the glass elements, means for causing the circulation therein of a gaseous fluid charged with thermal energy and acting by convection on the surfaces of the glass elements, as well as elements heated to high temperature, disposed in the chamber and capable of emitting the radiated thermal energy which comprises an appreciable part of rays passing through the glass and is adapted to bring the core of the glass elements to a temperature at least equal to that of the layers near the surface.

The elements heated to high temperature are either electric resistances, or surfaces brought to incandescence by combustion of a gas, distributed over the internal walls or on the roof and the bottom of the chamber, according to whether the conveyor for the glass permits the elements to be suspended vertically or to be disposed in the horizontal position.

The means for causing a gaseous fluid to circulate in the chamber comprise, outside the chamber, an impeller and a heating means for this fluid, and also a mixing device for fresh added fluid when the fluid is recirculated and, inside the chamber, either nozzles causing the fluid to flow tangentially of the surfaces of the glass elements along the chamber, or rows of fluid projection jets delivering the said fluid onto the surfaces of the glass elements.

The rows of projection jets for the gaseous fluid and the elements heated to high temperature are preferably disposed alternately in compartments disposed along the longitudinal walls of the chamber or along the roof and the bottom of the chamber, depending on the type of conveyor used for the glass elements.

The accompanying drawing illustrates by way of example several embodiments of the heating arrangement for carrying out the process according to the invention.

FIG. 1 is a diagrammatic horizontal section of a means for heating glass sheets suspended vertically from a monorail.

FIG. 2 is a diagrammatic vertical section showing another embodiment of the means for heating glass sheets, the latter being conveyed in a horizontal position.

The arrangement according to FIGURE 1 is a furnace of which the chamber 1 defines an internal volume 2. The chamber is formed with two slots 3 and 4, one serving for the introduction and the other for the discharge of the sheets which are to be heated. These slots are closed by doors 5 and 6 which open with the passage of the glass sheets 7. These latter are conveyed through the furnace by means of a conveyor 8, for example a monorail from which they are suspended.

Radiant elements 9 are arranged in the furnace on either side of the glass sheets which are to be heated. These elements are advantageously electric resistances, but they can also be radiant surfaces brought to incandescence by combustion of a gas. The temperature to which the elements are brought depends on the thickness of the glass to be heated and its transparency characteristic as a function of the wavelengths of the radiation. According to the invention, the temperature of the radiant elements is chosen such that the glass is transparent for an appreciable proportion of their radiation. For example, a soda-lime glass having a composition such as generally used for drawing purposes is transparent for radiations below 2.7 microns, and the radiant elements will then be brought to a temperature in the region of 1200° C., which is the temperature at which the maximum of the radiated energy is between 1.5 and 2 microns. It is obvious that the temperature to which the resistances 9 are brought is a function of the supply current voltage. This latter is regulated by means of a transformer having a variable secondary voltage.

The thermal energy acting by convection in a gaseous medium is introduced into the chamber 2 through two injection nozzles 10 opening into the front wall of the furnace on either side of the opening 3. These nozzles are connected by a pipeline 11 to a gas impeller 12, in the present case a fan, which draws in external air and blows it into the furnace. A heating means 13 interposed in the pipeline 11, makes it possible to communicate to the air the thermal energy which is necessary for heating the surface layers of the glass to a temperature which is at most equal to that of the core of the glass, which is itself substantially heated by the energy radiated by the radiant elements 9. Valves 14 make it possible for the air introduced into the furnace to be regulated and two pipes 15 provided with valves 16 and disposed in the rear wall of the furnace serve to evacuate the air which is introduced thereinto.

The arrangement shown in FIGURE 2 comprises a preferred form of the invention, which includes a system in which the surface layers of the sheets are heated by convection, by circulation of the gaseous fluid in a closed circuit, and it shows a furnace for the treatment of the sheets 7 on a horizontal conveyor. This latter is for example a metal conveyor, of which the conveying section 17, driven by the rollers 18, extends through the furnace, while the return section 19 is preferably disposed outside the furnace and travels over the return rollers 20.

The roof and the bottom of the chamber are equipped with baffles 21 which define alternate compartments 22 and 23, the compartments 22 containing the radiant elements 9 and the compartments 23 comprise rows of blowing jets 24. The radiant elements 9 are for example electric resistances, as described above. Each row of blowing jets 24 comprises a pipe 25 supplying the gaseous fluid, generally air, and a box 26 distributing the gas to the nozzles 27 directed towards the surfaces of the sheets 7. The gaseous medium is displaced by a propulsion means 12, in the present case a rotary pump, connected to the blowing nozzles 24 by a pipeline 28. The gas leaves the furnace through the conduits 29 which are equipped with valves 30 and is supplied to a temperature control device 31, from which it is drawn by the rotary pump in order to carry out a fresh circulation through the furnace. Valves 32 are disposed at each of the conduits 25 and permit the delivery of the blowing jets 24 to be individually controlled. In addition, a pipe 33 with a valve 34 enables the fresh air to be drawn into the control device 31 and to be mixed with the air circulation in a closed circuit and a valve 35 in a branch pipe on the pipeline system 29 serves for regulating the quantity of circulating air.

It is obvious that the invention is not limited to the embodiments which have been described and illustrated by way of example, and it would not constitute any departure from the scope thereof to incorporate modifications, particularly by causing the gas to circulate in counter current to the direction of advance of the glass sheets, in an open circuit or in a closed circuit, in the arrangement according to FIGURE 1, or by providing the gas outlet in the middle of the furnace, the supply then taking place through the two ends.

I claim:

1. In a process for heating glass sheets with a view to a subsequent thermal treatment, which comprises placing separate glass sheets in a closed chamber in spaced relation to each other and to the interior surfaces of such chamber, heating a gaseous fluid, projecting the heated gaseous fluid into the chamber so that it simultaneously subjects both faces of the glass sheets in the chamber to convection heating sufficient to raise both face layers of the glass sheets to a predetermined temperature approaching the softening temperature of the glass thereof, heating in the chamber a plurality of heating elements capable of being heated to an incandescence at which they will project radiant heat having an appreciable proportion of rays to which the glass in such sheets is transparent, supplying fuel to such elements until they are brought to a temperature for the glass in such sheets which is compatible to about 1200° C. for a soda-lime glass transparent to radiations below 2.7 microns whereat the maximum of the radiated energy from such elements is between 1.5 and 2 microns, and projecting the radiant heat emitted from such elements at such compatible temperature through the face layers of the glass sheets that are being subjected to said convection heating to heat simultaneously the centers of such glass sheets to a temperature at least equalling the temperature to which the face layers are then being heated by such convection heat.

2. Means for heating glass sheets including a closed chamber, means for supporting glass sheets in said chamber in spaced relation to each other and to the interior surfaces of said chamber, means for heating a gaseous fluid to high heat, means for projecting streams of the heated gaseous fluid into the chamber so that it simultaneously subjects both faces of the glass sheets in the chamber to convection heating sufficient to raise both face layers of the glass sheets to a predetermined temperature approaching the softening temperature of the glass thereof, a plurality of heating elements mounted in said chamber and each being capable of being heated to an incandesence at which it will project radiant heat having an appreciable proportion of rays to which the glass in such sheets is transparent, means for supplying fuel to said elements to bring them to a temperature for the glass in such sheets which is compatible to about 1200° C. for a soda-lime glass transparent to radiations below 2.7 microns whereat the maximum of the radiated energy from such elements is between 1.5 and 2 microns, said elements being arranged in said chamber to project the radiant heat emitted therefrom at such compatible temperature through the face layers of the glass sheets that are being subjected to said convection heating to heat simultaneously the centers of such glass sheets to a temperature at least equalling the temperature to which the face layers are then being heated by such convection heat.

3. The heating means of claim 2, in which said radiation heating elements are arranged in spaced relation in two series thereof disposed on opposite sides of the glass sheets in said closed chamber, the heating elements in each series being disposed in opposed relation to the heating elements in the other series and being paired with the heating elements in such other series.

4. The heating means of claim 2, in which said heated gaseous fluid projecting means is located at one end of said closed chamber and projects the heated gaseous fluid into the chamber so as to cause it to travel therethrough in a direction parallel to the faces of the glass sheets and between the glass sheets and said radiation heating elements.

5. The heating means of claim 2, in which said closed chamber is provided along its length with a plurality of pairs of symmetrically opposed chambers on opposite sides of said glass sheets and having inner spaced ends open to the glass sheets, in which said heated gaseous fluid projecting means comprises means in alternate pairs of said opposed chambers for projecting the heated gaseous fluid over both faces of the glass sheets, and in which said radiation heating elements are mounted in the remaining alternate pairs of said opposed chambers, and means at one end of said chamber for drawing the heated gaseous fluid projected from said alternate pairs of opposed chambers between the open ends of said remaining alternate pairs of opposed chambers and for withdrawing the heated fluid from said closed chamber.

6. The heating means of claim 5, in which the means in said alternate pairs of opposed chambers for projecting the heated gasous fluid over the faces of the glass sheets comprises a plurality of nozzles arranged to project the heated gaseous fluid normal to the planes of the faces of the glass sheets.

7. Means for heating glass sheets including an elongated closed chamber, a conveyor for moving individual glass sheets along the length of said chamber, means for heating the face layers of said glass sheets by convection to a predetermined temperature approaching the softening temperature of the glass thereof, and means for heating the centers of said glass sheets by radiation to a temperature at least equalling the temperature of said face layers, said radiation heating means comprising a series of symmetrically opposed radiating surfaces brought to incandescence by combustion of a gas and disposed on opposite sides of the path of travel of said glass sheets through said elongated closed chamber, the preponderant amount of rays from said radiating surfaces having wave lengths less than about 2.7 microns.

8. Means for heating glass sheets including an elongated closed chamber, a conveyor for moving individual glass sheets along the length of said chamber, means for heating the face layers of said glass sheets by convection to a predetermined temperature approaching the softening temperature of the glass thereof, and means for heating the centers of said glass sheets by radiation to a temperature at least equalling the temperature of said face layers, said elongated closed chamber being provided along its length wth a plurality of pairs of symmetrically opposed chambers disposed on opposite sides of the path of travel of said glass sheets and open thereto, alternate pairs of said opposed chambers being provided with said means for effecting the convection heating of the faces of said glass sheets as they are conveyed therepast, and the remaining alternate pairs of said opposed chambers being provided with said means for effecting the radiant heating of the centers of said glass sheets as they are conveyed therepast, said convection heating means comprising a plurality of streams of heated gas projected in directions normal to the planes of the faces of said glass sheets and said radiation heating means comprising a plurality of radiating surfaces brought to incandescence by combustion of a gas.

References Cited

UNITED STATES PATENTS

| | | | |
|---|---|---|---|
| 2,924,695 | 2/1960 | Atkeson | 65—114 X |
| 3,223,498 | 12/1965 | Davidson | 65—114 X |
| 3,248,195 | 4/1966 | Golightly et al. | 65—107 |

DONALL H. SYLVESTER, *Primary Examiner.*

A. D. KELLOGG, *Assistant Examiner.*